(12) United States Patent
Metcalfe et al.

(10) Patent No.: US 9,179,039 B2
(45) Date of Patent: Nov. 3, 2015

(54) METHODS AND SYSTEMS FOR PROCESSING LOW RESOLUTION IMAGES VIA ERROR DIFFUSION

(71) Applicant: Xerox Corporation, Norwalk, CT (US)

(72) Inventors: David J. Metcalfe, Marion, NY (US); Ryan D. Metcalfe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/179,111

(22) Filed: Feb. 12, 2014

(65) Prior Publication Data

US 2015/0229807 A1    Aug. 13, 2015

(51) Int. Cl.
| H04N 1/405 | (2006.01) |
| H04N 1/40 | (2006.01) |
| H04N 1/409 | (2006.01) |
| G06K 15/02 | (2006.01) |
| G06F 3/12 | (2006.01) |

(52) U.S. Cl.
CPC ................................ H04N 1/4052 (2013.01)

(58) Field of Classification Search
None
See application file for complete search history.

(56) References Cited

U.S. PATENT DOCUMENTS

| 5,363,213 | A | * | 11/1994 | Coward et al. | 382/299 |
| 5,787,206 | A | * | 7/1998 | Williams et al. | 382/237 |
| 5,805,724 | A | * | 9/1998 | Metcalfe et al. | 382/176 |
| 5,822,464 | A | * | 10/1998 | Metcalfe | 382/252 |
| 5,933,539 | A | * | 8/1999 | Metcalfe et al. | 382/252 |
| 5,937,147 | A | * | 8/1999 | Ng | 358/1.9 |
| 7,397,587 | B2 | | 7/2008 | Os et al. | |
| 8,411,329 | B2 | | 4/2013 | Hoover | |
| 2002/0063710 | A1 | * | 5/2002 | Hirota et al. | 345/428 |
| 2006/0007465 | A1 | * | 1/2006 | Hayashi | 358/1.13 |
| 2007/0002381 | A1 | * | 1/2007 | Metcalfe et al. | 358/3.03 |
| 2010/0008599 | A1 | * | 1/2010 | Kawabe | 382/300 |
| 2010/0259771 | A1 | * | 10/2010 | Sakamoto | 358/1.2 |
| 2011/0052095 | A1 | | 3/2011 | Deever | |

FOREIGN PATENT DOCUMENTS

| EP | 0 851 658 A2 | 7/1998 |
| EP | 1 942 655 A1 | 7/2008 |
| EP | 2 046 011 A2 | 4/2009 |
| EP | 1 739 954 B1 | 8/2012 |

* cited by examiner

*Primary Examiner* — Beniyam Menberu
(74) *Attorney, Agent, or Firm* — Kermit D. Lopez; Luis M. Ortiz; Ortiz & Lopez, PLLC

(57) ABSTRACT

Methods and systems for processing a low resolution image via a low resolution error diffusion algorithm. A low resolution binary output pixel can be generated utilizing a general error diffusion algorithm. The low-resolution binary output pixel can be converted to a predetermined number of interpolated sub-pixel values and each interpolated sub-pixel values can be compared with a threshold in order to generate a scaled slow-scan output pixel utilizing the low resolution error diffusion algorithm. The low resolution error diffusion algorithm includes a highlight threshold adjustment module that adjusts level in order to prevent the scaled slow-scan output pixel from firing around the low resolution binary output pixel within a highlight region. A slow scan error with respect to the scaled slow-scan output pixel can be distributed and stored via error diffusion filter coefficients within an error buffer without additional memory.

20 Claims, 13 Drawing Sheets

METHODS AND SYSTEMS FOR PROCESSING LOW RESOLUTION IMAGES VIA ERROR DIFFUSION

FIELD OF THE INVENTION

Embodiments are related to error diffusion rendering techniques. Embodiments are additionally related to the processing of low-resolution images. Embodiments further relate to multi-function office reprographic devices.

BACKGROUND

A MFD (Multi-Function Device) is a rendering device or office machine which incorporates the functionality of multiple devices in a single apparatus or system so as to offer a smaller footprint in a home or small business setting, or in some cases, to provide centralized document management/distribution/production in the context of, for example, a large-office setting. A typical MFD may provide a combination of some or all of the following capabilities: printer, scanner, photocopier, fax machine, e-mail capability, and so forth. Networked MFDs (Multi-Function Devices) generally interact with an assemblage of varying rendering devices, client computers, servers, and other components that are connected to and communicate over a network.

Multi-function office reprographics devices utilize low-cost scanners in order to deliver a more economical solution. Unfortunately, such low-cost scanners do not provide a high-speed image processing throughput rate at a native image resolution, which is often expected by users and customers. For example, candidate low-cost scanners do not generate the desired 50 ppm processing rates when scanning at the native 600×600 spi resolution needed for the MFD products. Table 1 below summarizes an example benchmark study of applicable low-cost contact image sensors (CIS) for a competitive, low-cost MFD product under consideration. Note that such data is not considered a limiting feature of the disclosed embodiments, but is shown for exemplary purposes only. As indicated below, none of the candidate vendors met the 50 ppm product goal criteria at the 600×600 spi input scan resolution, whereas vendors "A" and "B" met the 50 ppm throughput rate but at a lower 600×300 spi resolution.

TABLE 1

| Resolution | A4 Document Throughput Speed (PPM) | | | MFD Product Goal |
|---|---|---|---|---|
| | Vendor "A" | Vendor "B" | Vendor "C" | |
| 600 × 300 SPI | 50 PPM | 76 PPM | Not Available | 50 PPM |
| 600 × 600 SPI | 25 PPM | 38 PPM | 20 PPM | |

Conventionally, error diffusion has been employed in a MFD copy-path to render a print-ready bitmap from a scanned monochrome/color image, since the error diffusion inherent properties provide favorable processing features without generating imaging/print artifacts. In general, processing an image via error diffusion generates an output image at the same input resolution, albeit with a lower bit-depth (i.e. 8 bpp→1 bpp). One alternative to processing the lower resolution image is to simply replicate/interpolate either an input contone image prior to rendering, or replicate a rendered binary output in order to generate the higher-resolution print-ready bitmap.

FIG. 1 represents a schematic diagram illustrating a snippet of 600×300 scan lines 10, with pixels 15 representing the lower-resolution scanned input image and the pixels 20 representing the interpolated or replicated scan lines. Unfortunately, either doubling the input 8 bpp contone image or 1 bpp binary output bitmap has throughput and image-quality disadvantages, respectively. Both techniques offer disadvantages with respect to the image-quality and/or reduced document throughput rates.

Based on the foregoing, it is believed that a need exists for an improved method and system for processing a low resolution image via a low resolution error diffusion algorithm, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for managing a MFD (Multi-Function Device).

It is another aspect of the disclosed embodiments to provide for improved error diffusion rendering techniques.

It is yet another aspect of the disclosed embodiments to provide for methods and systems for processing a low resolution image via a low-resolution error diffusion algorithm.

The aforementioned aspects and other objectives and advantages can now be achieved as described herein. A system and method for processing a low-resolution image via low resolution error diffusion (LRED) algorithm is disclosed herein. A low resolution binary output pixel (e.g., 300 spots generated per inch (spi) resolution) can be generated utilizing a general error diffusion algorithm. The low-resolution binary output pixel can be converted to a predetermined number of interpolated sub-pixel values and each interpolated sub-pixel values can be compared with a threshold in order to generate a scaled slow-scan output pixel (e.g., 600 dpi resolution) utilizing the low resolution error diffusion algorithm. The low-resolution error diffusion algorithm includes a highlight threshold adjustment module that adjusts the threshold level in order to prevent the scaled slow-scan output pixel from firing around the low-resolution binary output pixel within a highlight region. A slow scan error with respect to the scaled slow-scan output pixel can be distributed and stored via an error diffusion filter coefficient within an error buffer without additional memory. The low resolution error diffusion algorithm inherently scale-up the native resolution binary output image without dramatically impacting either the overall image-processing throughput rate or output image-quality.

The threshold level can be adjusted in the highlight region when quantizing the scaled slow-scan output pixel in order to prevent the pixels from firing dose to the low resolution binary output pixel counterparts. The amount of threshold adjustment can be programmable and is easily incorporated within the low resolution error diffusion algorithm utilizing a high-speed SIMD instruction. A potential error value can be selected based on the number of interpolated subpixels values exceeding the threshold value. The low resolution error diffusion algorithm can accept, for example, the lower-resolution 600×300 spi input image and inherently scale this up to, for example, a 600×600×1 print-ready output image with high-speed image processing throughput rates.

The system processes images at a lower resolution and then upscales in order to provide a 2× slow-scan scaling factor at a final rendering stage in a software image path (SWIP) environment. The low resolution error diffusion algorithm reduces the amount of data required to process the low resolution binary output pixel within an upstream filter/segmentation/color-space conversion module so that more time can be made available to incorporate further intermediate and complex per-pixel processing features to each algorithm. The low resolution error diffusion algorithm can be written in a programming language (e.g., C++) utilizing the SIMD instruction code in order to model the rendered output, evaluate the resulting IQ, and ultimately to demonstrate/measure a high-speed benefit that can be achieved within the software image-path environment. The LRED algorithm represents a perfect candidate for a draft copy mode, where even higher processing rates are required beyond the MFD default (e.g., 50 ppm) setting.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
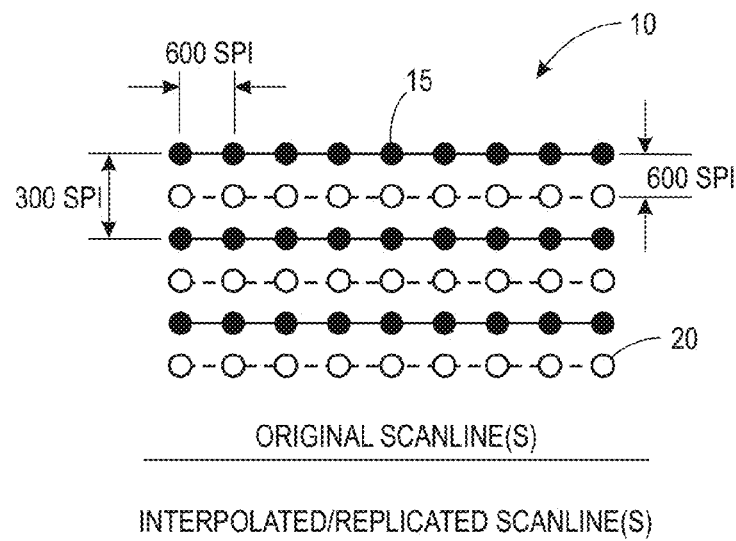
FIG. 1 illustrates a schematic representation of example 600×300 scanlines representing a lower-resolution scanned input image and an interpolated scanline.
Figure 2:
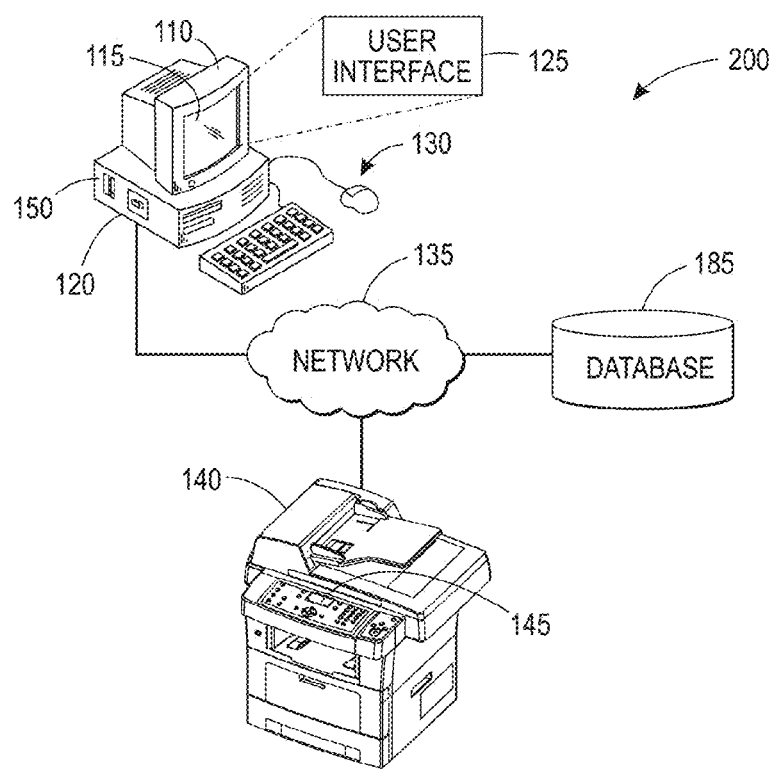
FIG. 2 illustrates an example of a multi-function device coupled to a data-processing apparatus through a network, in accordance with the disclosed embodiments.

Referring to FIG. 2, system 200 can be configured to include one or more networked devices, such as networked device 140, coupled to a data-processing apparatus 110 through a network 135. In some embodiments, networked device 140 may be a rendering device such as a printer, scanner, copy machine, etc, In other embodiments, networked device 140 may be a MFD, a file server, and/or a print server. The data-processing apparatus 110 may be, for example, a personal computer or other computing device, and generally includes a central processor 120, a display device 115, an input unit 130 (e.g., keyboard, mouse, etc.).

Note that as utilized herein, the term networked device may refer to an apparatus or system such as a printer, scanner, fax machine, copy machine, etc., and/or a combination thereof (e.g., a MFD). Preferably, networked device 140 is a MFD capable of multiple rendering functions such as printing, copying, scanning, faxing, etc. In some embodiments, the MFD 140 may be implemented with a single rendering function such as printing. In other embodiments, the MFD 140 can be configured to provide multiple rendering functions such as scanning, faxing, printing and copying.

The data-processing apparatus 110 can be coupled to the MFD 140 (and other rendering devices) through a computer network 135. Network 135 may employ any network topology, transmission medium, or network protocol. The network 135 may include connections such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The networked MFD 140 includes a user interface 145 such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the MFD 140.

The data-processing apparatus 110 also includes a GUI 125 for communicating rendering features for processing, for example, the rendering job to the user and accepting the users selection of available rendering features. The user interface 125 displays information and receives data through device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

The input device of the networked device 140, for example, may be a local user interface 145 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interlace by manipulating the touch screen, keypad, or communicating via wireless messages through the wireless port. The administrators portable device that communicates wirelessly may be a personal digital assistant (PDA) or the like, as noted above.

The following description is presented with respect to embodiments of the disclosed embodiments, which can be embodied in the context of the data-processing apparatus 110 and the networked device 140 depicted in FIG. 2. The disclosed embodiments, however, is not limited to any particular application or any particular environment. Instead, those skilled in the art will find that the system and methods of the disclosed embodiments may be advantageously applied to a variety of system and application software including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 3:
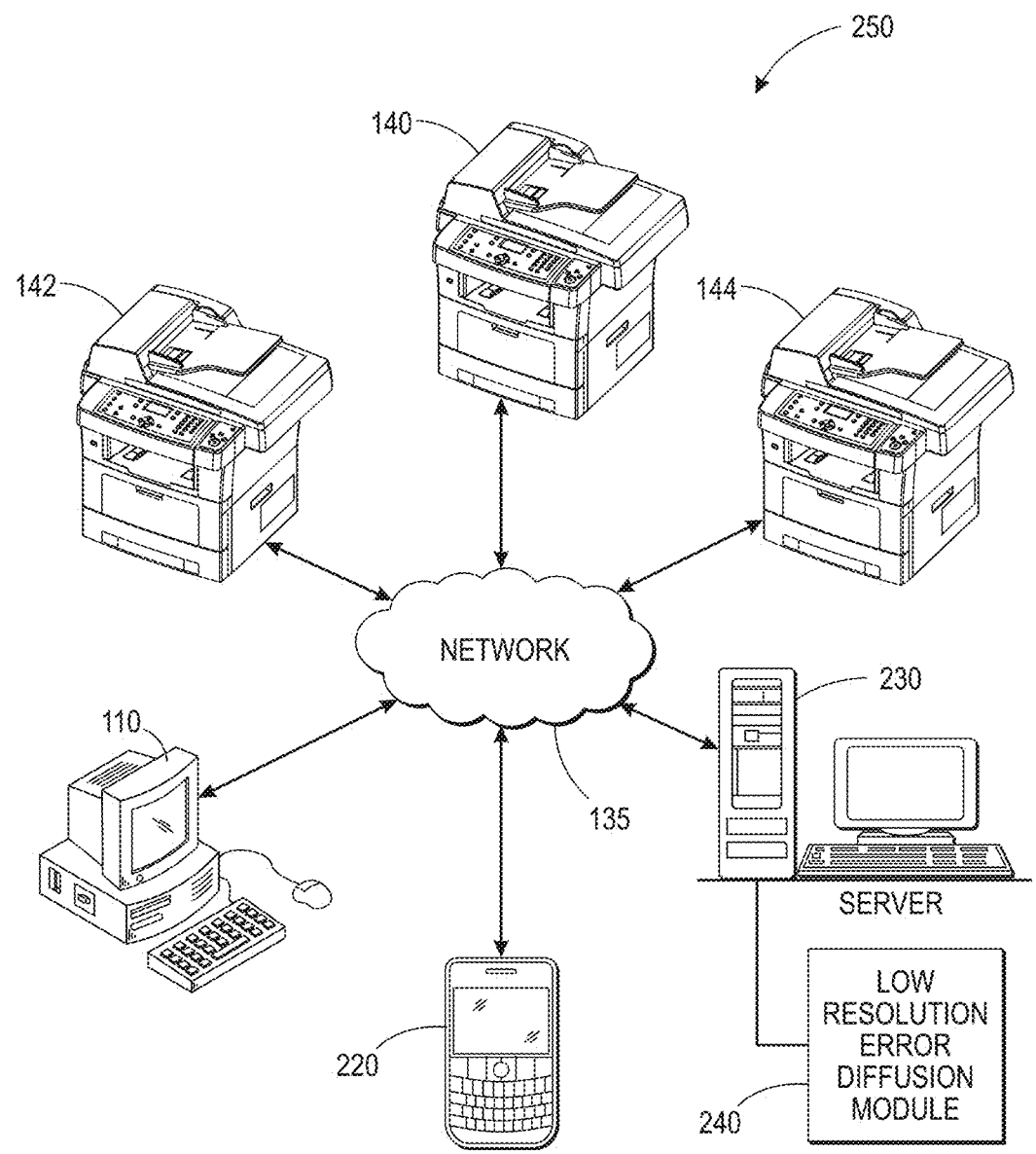
FIG. 3 illustrates a graphical representation of a device management system having a low resolution error diffusion module associated with a network, in accordance with the disclosed embodiments.

FIG. 3 illustrates a graphical representation of a device management system 250 having a low resolution error diffusion module 240 associated with a network 135, in accordance with the disclosed embodiments. The device management system 250 depicted in FIG. 3 generally includes the network infrastructure 135 associated with one or more networked MFDs 140, 142, and 144, data-processing system 110, a mobile communication device 220, and an EIP server 230. Data-processing apparatus 110 depicted in FIG. 2 can be, for example, a server. Other devices such as, for example, desktops, network devices, palmtops, mobile phones, etc., may also be included in the network 135 as service providers. The MFDs 140, 142, and 144 can be located remotely with respect to each other, or alternatively, they may be located locally with respect to each other.

The typical MFD may act as a combination of a printer, scanner, photocopier, fax and e-mail. While three MFDs 140, 142, and 144 are shown by way of example, it is to be appreciated that any number of MFDs may be linked to the network such as four, six or more rendering devices. In general, the MFDs 140, 142, and 144 can be employed to perform a rendering output function (e.g., printing, scanning, copying, faxing, etc.) within a networked environment. Note that MFDs 140, 142, and 144 are generally analogous to one another.

The low resolution error diffusion module 240 associated with the server 230 can be adapted for processing a low resolution image via error diffusion. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media The present invention is capable of being distributed as a program product in a variety of forms, which apply equally regardless of the particular type of signal-bearing media utilized to carry out the distribution.

Examples of signal-bearing media can include, for example, recordable-type media such as USB flash drives, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

Figure 4:
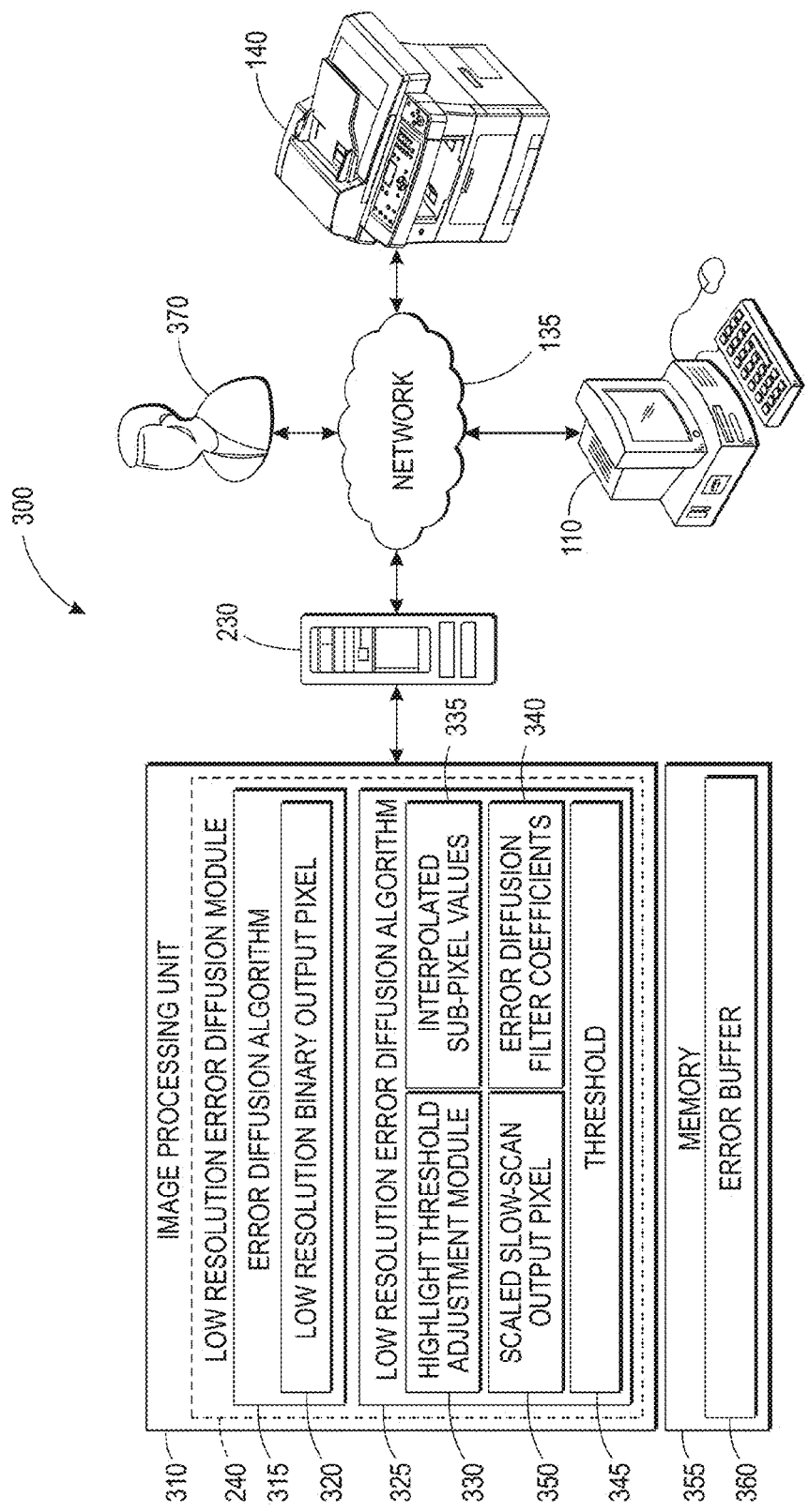
FIG. 4 illustrates a block diagram of a low resolution error diffusion system, accordance with the disclosed embodiments.

FIG. 4 illustrates a block diagram of a low resolution error diffusion system 300, in accordance with the disclosed embodiments. The low resolution error diffusion system 300 includes an image processing unit 310 connected to the MFD 140 via a network 135. The image processing unit 310 includes the low resolution error diffusion module 240 for processing a low resolution image via a low resolution error diffusion algorithm 325. The image processing unit 310 is preferably a small, handheld computer device or palmtop computer that provides portability and is adapted for easy mounting.

In general, error diffusion is a type of halftoning in which the quantization residual is distributed to neighboring pixels that have not yet been processed. Error diffusion converts a multi-level image into a binary image, though it has other applications. Unlike many other halftoning methods, error diffusion is classified as an area operation, because what the algorithm does at one location influences what happens at other locations. Error diffusion has the tendency to enhance edges in an image. This can make text in images more readable than in other halftoning techniques.

The low resolution error diffusion module 240 can be configured to include an error diffusion algorithm 315 and the low resolution error diffusion algorithm 325 for generating two distinct binary output pixels 320 and 350. The general error diffusion algorithm 315 generates the low resolution binary output pixel 320 (600×300 spi). The low resolution error diffusion algorithm 325 converts the low-resolution binary output pixel 320 to a predetermined number of interpolated sub pixel values 335. The low resolution error diffusion algorithm 325 further compares each interpolated sub pixel values 335 with a threshold 345 in order to generate the scaled slow-scan output pixel 350 (600×600×1).

In general, the resolution of the pixel is represented as fast-scan resolution, slow-scan resolution, and pixel depth resolution (e.g. 600×600×1). The fast-scan resolution refers to the number of pixels or spots generated per inch (spi) in the fast-scan direction or electrical scan of the image. More specifically, fast scan resolution refers to the resolution of the number of pixels making up a single scanline of an image. Moreover, slow-scan resolution refers to the number of pixels or spots per inch (spi) in the slow-scan direction; i.e., slow-scan resolution refers to the number of scanlines generated per inch. The pixel depth resolution refers to the number of bits (bpp) utilized to define the grayscale properties of a pixel or sub pixel.

The low resolution error diffusion algorithm 325 includes a highlight threshold adjustment module 330 that adjusts a threshold level 345 in order to prevent the scaled slow-scan output pixel 350 from firing around the low resolution binary output pixel 320 within a highlight region. The low resolution error diffusion module 240 distributes and stores a slow scan error with respect to the scaled slow-scan output pixel 350 via an error diffusion filter coefficient 340 within an error buffer 360 without additional memory. The low resolution error diffusion module 240 inherently scale-up the native resolution binary output pixel 320 without dramatically impacting either an image-processing throughput rate or degrade an output image-quality.

Figure 5:
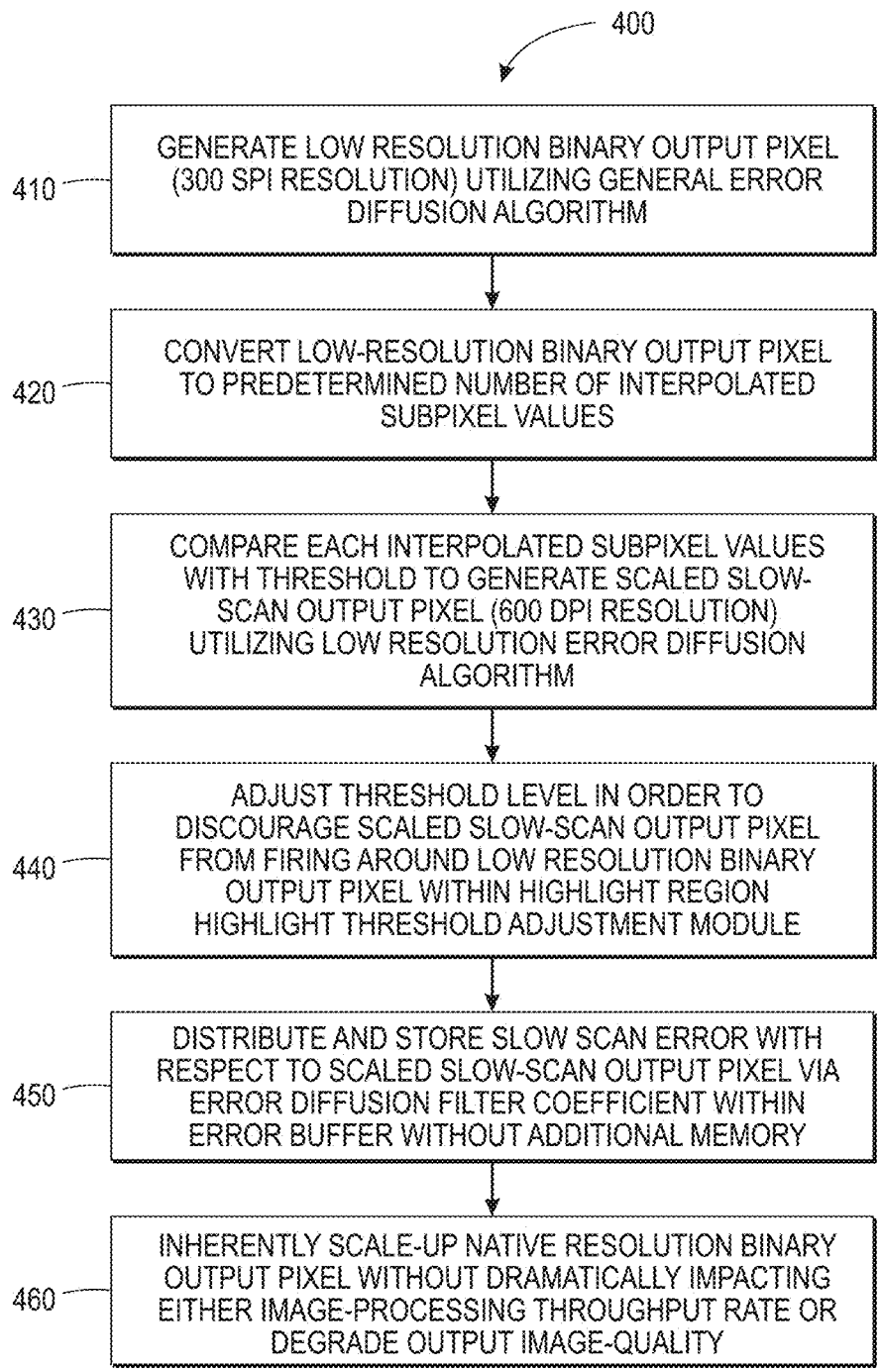
FIG. 5 illustrates a high level flow chart of operation illustrating logical operational steps of a method for processing a low resolution image via a low resolution error diffusion algorithm, in accordance with the disclosed embodiments.

FIG. 5 illustrates a high level flow chart of operation illustrating logical operational steps of a method 400 for processing the low resolution image 320 via the low resolution error diffusion algorithm 325, in accordance with the disclosed embodiments. Note that in FIGS. 2-17, identical or similar blocks are generally indicated by identical reference numerals. Initially, as indicated at block 410, the low resolution binary output pixel 320 can be generated utilizing the general error diffusion algorithm 315. The low-resolution binary output pixel 320 can be converted to the predetermined number of interpolated sub pixel values 335, as indicated at block 420. Each interpolated sub pixel values 335 can be compared with the threshold 345 in order to generate the scaled slow-scan output pixel 350 utilizing the low resolution error diffusion algorithm 325, as illustrated at block 430.

The low resolution error diffusion algorithm 325 includes the highlight threshold adjustment module 330 that adjusts the threshold level 345 in order to prevent the scaled slow-scan output pixel 350 from firing around the low resolution binary output pixel 320 within the highlight region, as indicated at block 440. The slow scan error with respect to the scaled slow-scan output pixel 350 can be distributed and stored via the error diffusion filter coefficient 340 within the error buffer 360 without additional memory, as shown at block 450. The low resolution error diffusion algorithm 325 inherently scale-up the native resolution binary output pixel 320 without dramatically impacting either an image-processing throughput rate or degrade an output image-quality, as depicted at block 460.

Figure 6:
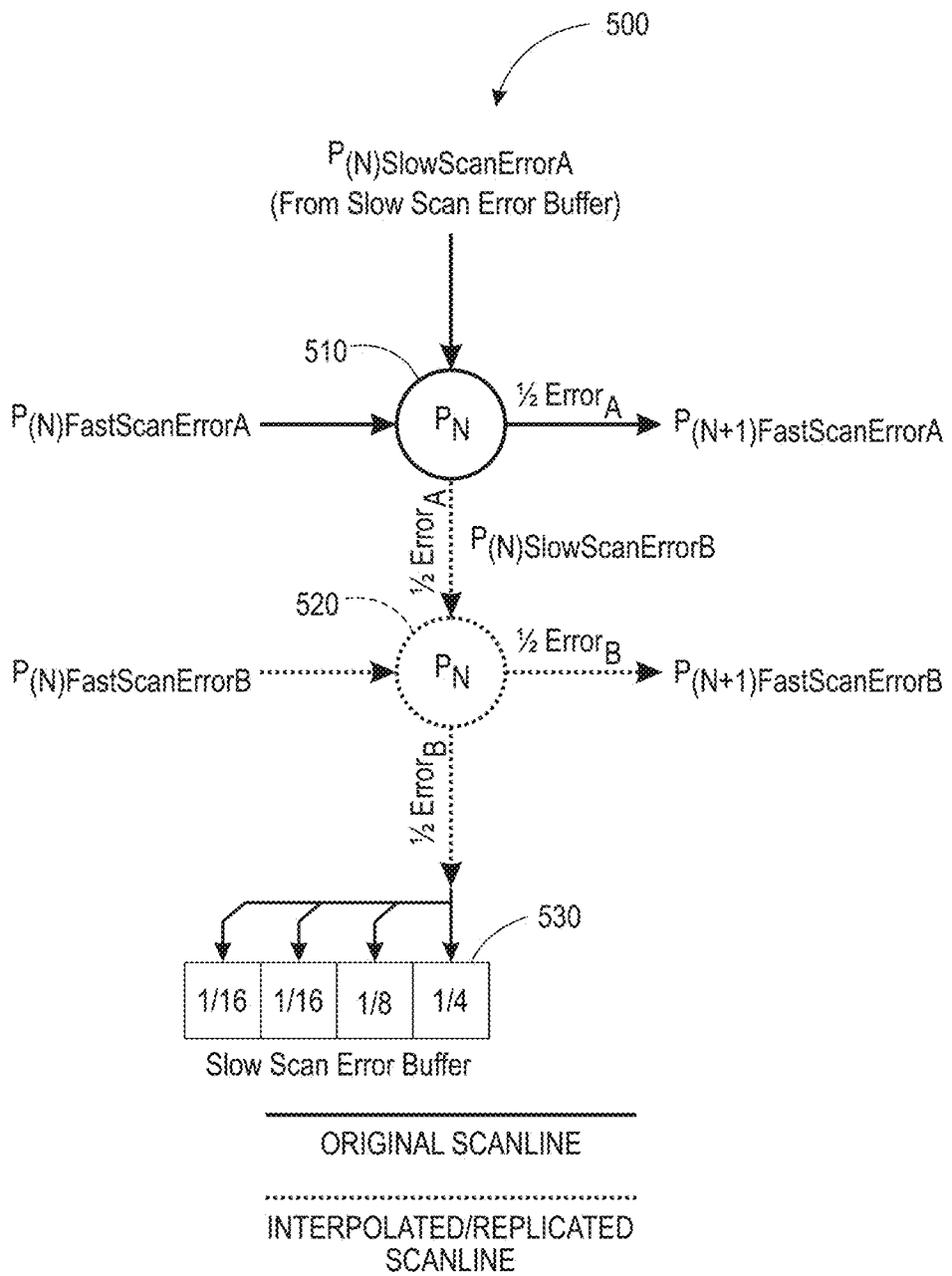
FIG. 6 illustrates a schematic block diagram representing the low resolution error diffusion algorithm, in accordance with the disclosed embodiments.

FIG. 6 illustrates a schematic block diagram 500 representing the low resolution error diffusion algorithm 325, in accordance with the disclosed embodiments. The low resolution error diffusion (LRED) algorithm 325 generates the two distinct binary output pixels 320 and 350, where the $1^{st}$ calculation 510 represents the traditional error diffusion calculation and the $2^{nd}$ calculation 520 represents the added required needed to generate the slow-scan pixel.

Note that the diagram 500 depicted in FIG. 6 generally illustrates all the slow-scan error components that are processed and diffused to the subsequent scanlines. In other words, $P_N$ shown in FIG. 6 represents the actual binary pixel that is generated via LRED, and the block 530 represents the error filter coefficients that will process the "$Error_B$" component. The actual "$P_N$" value contained within the second dashed-line bubble 520 shown in FIG. 6 represents the actual binary output generated via LRED processing.

The "A" pixel calculations 510 represent the traditional error diffusion processing at the native 300 spi resolution, whereas the "B" calculations 520 represent the additional calculations needed to generate the new slow-scan binary output 350 in order to achieve a 600 dpi resolution bitmap.

Figure 7:
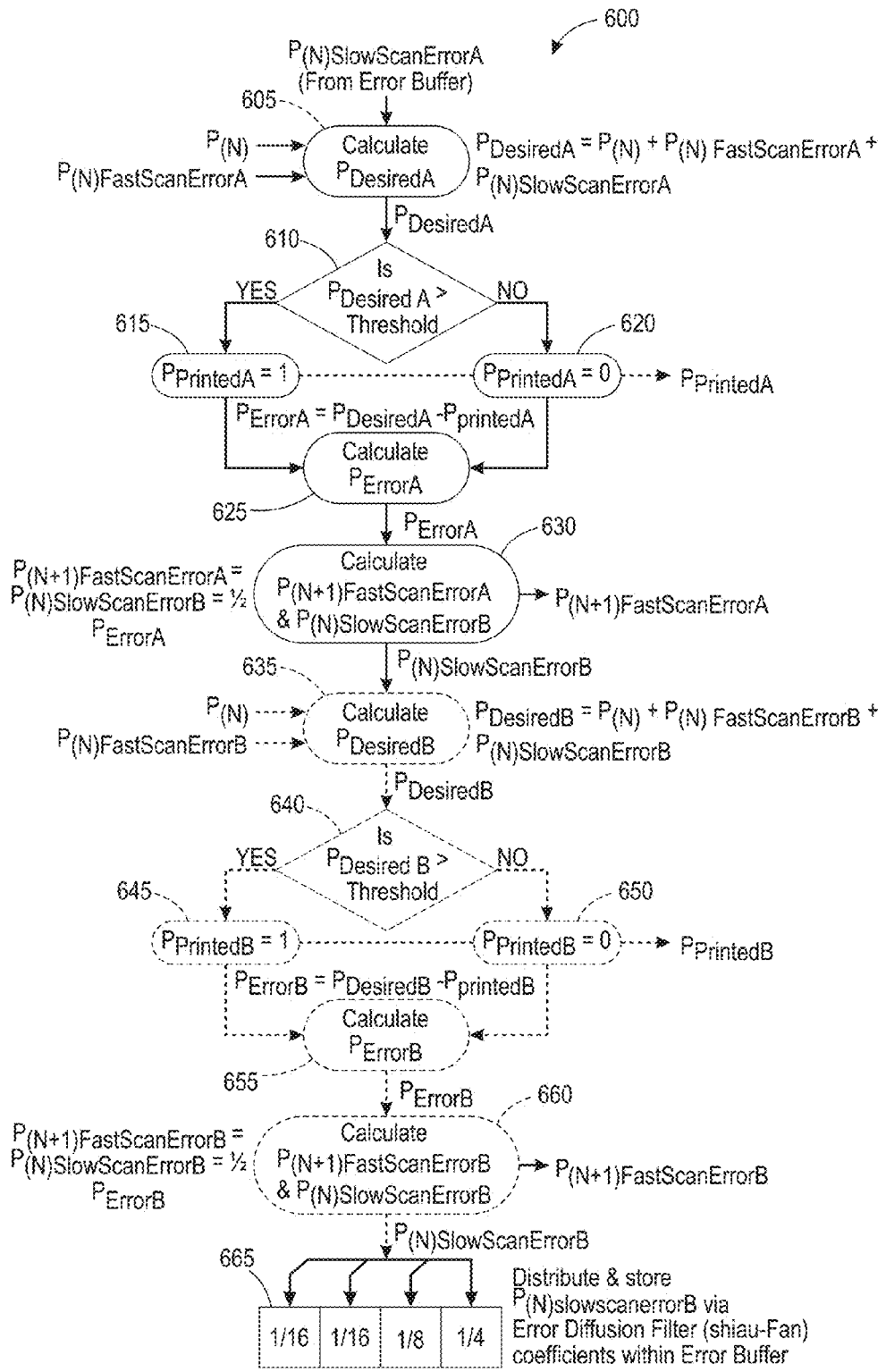
FIG. 7 illustrates a detailed block diagram representing the low resolution error diffusion algorithm, in accordance with the disclosed embodiments.

FIG. 7 illustrates a detailed block diagram 600 representing the low resolution error diffusion algorithm 325, in accordance with the disclosed embodiments. $P_{DesiredA}$ output can be calculated utilizing inputs from $P_{(N)SlowScanErrorA}$ (from error buffer), no of pixels $P_{(N)}$ and $P_{(N)FastScanErrorA}$ where $P_{DesiredA}$ can be equal to $P_{(N)}+P_{(N)FastscanErrorA}\ P_{(N)SlowScanErrorA}$, as indicated at block 605. A determination can be made whether $P_{DesiredA}$ is greater than the threshold, as indicated at block 610. If $P_{DesiredA}$ is greater than the threshold level, then $P_{PrintedA}$ is equal to 1, and then $P_{ErrorA}$ can be calculated, as shown at blocks 615 and 625, where $P_{ErrorA}$ is equal to $P_{DesiredA}-P_{PrintedA}$. If $P_{DesiredA}$ is not greater than the threshold level, then $P_{PrintedA}$ is equal to 0 and then $P_{ErrorA}$ can be calculated, as shown at blocks 620 and 625. Thereafter, $P_{(N+1)FastScanErrorA}$ and $P_{(N)SlowScanErrorB}$ can be calculated, as indicated at block 630. $P_{DesiredB}$ output can be calculated utilizing an input from a $P_{(N)SlowScanErrorB}$, no of pixels $P_{(N)}$ and a $P_{(N)FastScanErrorB}$, where $P_{DesiredB}$ can be equal to $P_{(N)}+$a $P_{(N)FastScanErrorB}+P_{(N)SlowScanErrorB}$, as illustrated at block 635. A determination can be made whether $P_{desiredB}$ is greater than the threshold, as indicated at blocks 640. If $P_{DesiredB}$ is greater than the threshold level, then $P_{PrintedB}$ can be equal to 1 and $P_{ErrorB}$ can be calculated, as depicted at blocks 645 and 655. $P_{ErrorB}$ can be equal to $P_{DesiredB}-P_{PrintedB}$. If $P_{DesiredB}$ is not greater than the threshold level, then $P_{PrintedB}$ can be equal to 0 and then $P_{ErrorB}$ can be calculated, as shown at block 650 and 655. Thereafter $P_{(N+1)FastScanErrorB}$ and $P_{(N)SlowScanErrorB}$ can be calculated with respect to the input from $P_{ErrorB}$, where $P_{(N+1)FastScanErrorB}$ can be equal to $P_{(N)SlowScanErrorB}$ which can be equal to ½ $P_{ErrorB}$, as indicated at block 660. The output $P_{(N)SlowScanErrorB}$ can be distributed and can be stored via an error diffusion filter (shiau-Fan) coefficients 340 within the error buffer 360, as depicted at block 665. The memory 355 required to store the error is the same as processing the image at a 300 spi resolution (i.e. no additional memory required).

Figure 8:
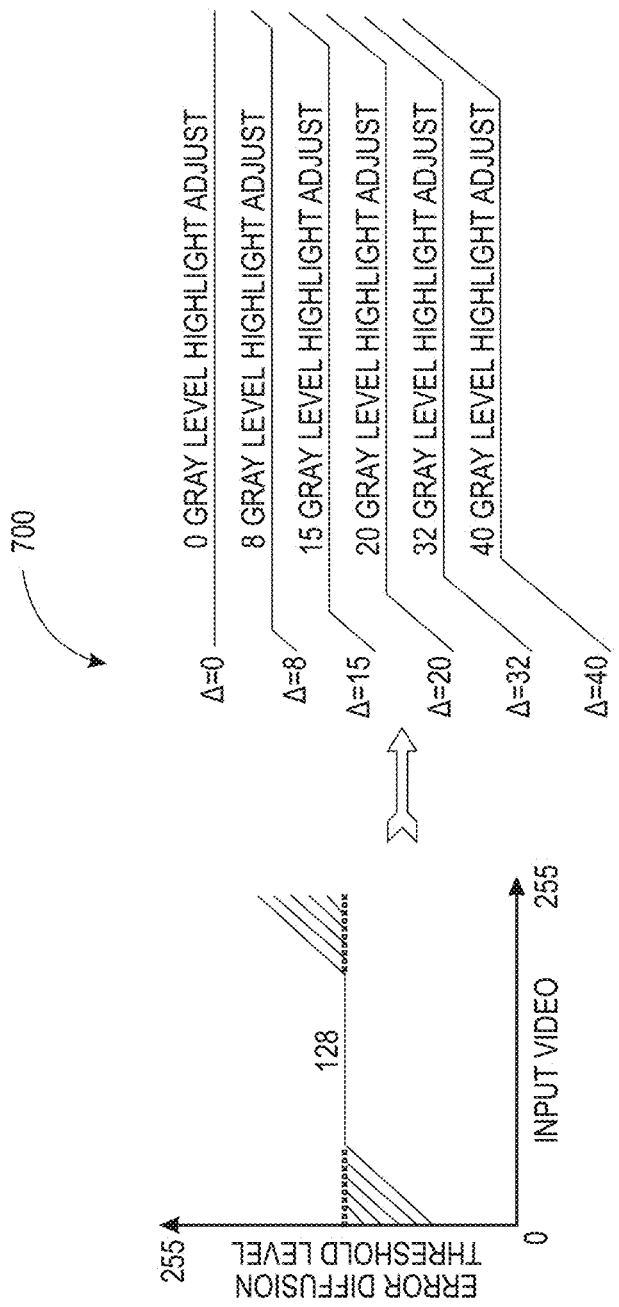
FIG. 8 illustrates a graphical representation of an error diffusion threshold level, in accordance with the disclosed embodiments.
Figure 9:
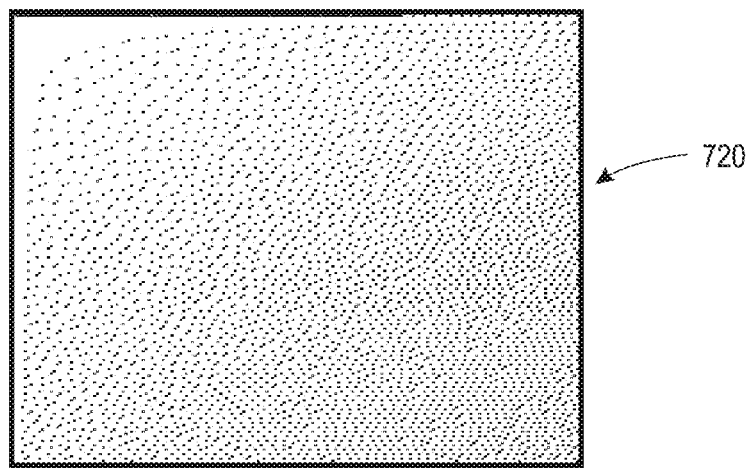
FIGS. 9-14 illustrate bitmaps processed via LRED algorithm with various highlight threshold adjustment level, in accordance with the disclosed embodiments.
Figure 10:
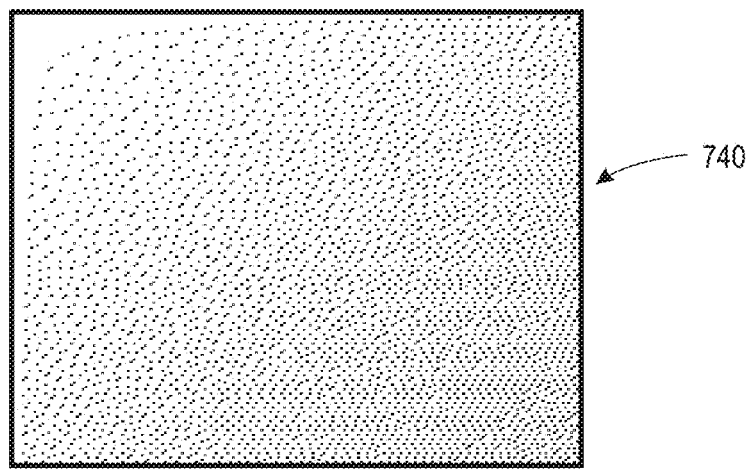
Figure 11:
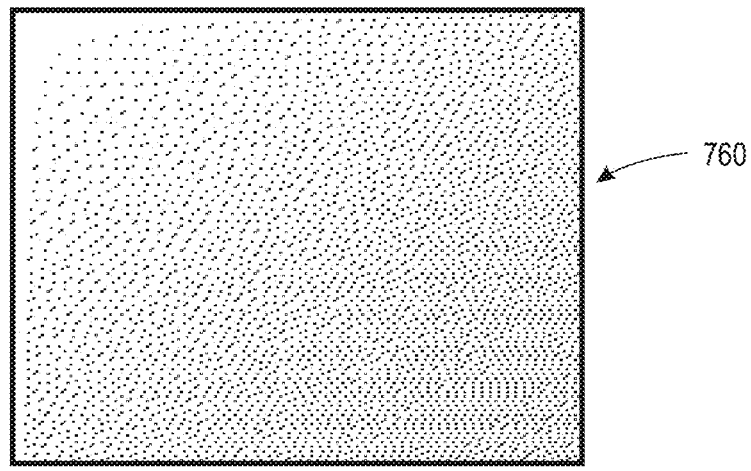
Figure 12:
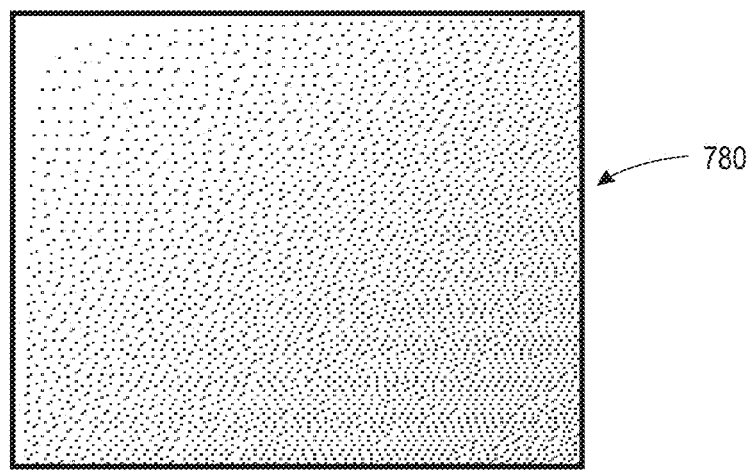
Figure 13:
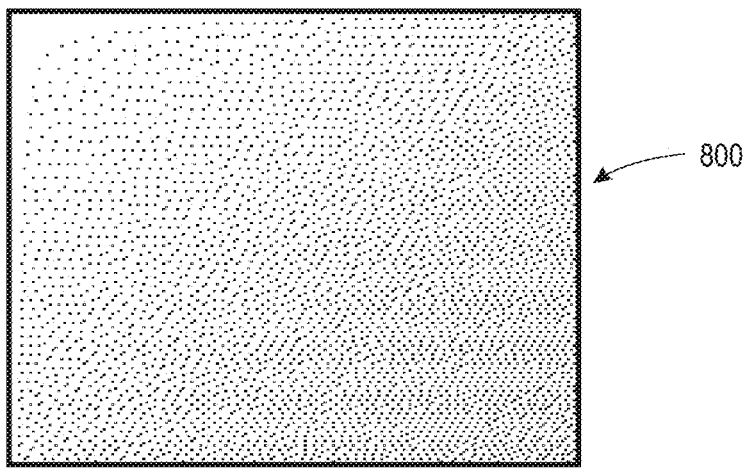
Figure 14:
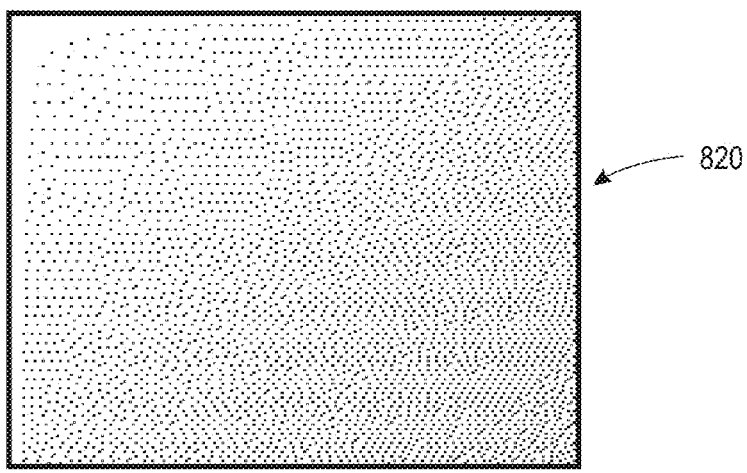

FIG. 8 illustrates a graphical representation of an error diffusion threshold level 700, in accordance with the disclosed embodiments. The highlight threshold adjustment module 330 adjusts the error diffusion threshold level 700 in order to eliminate the "A" and "B" binary output pixels 320 and 350 to cluster in the highlight regions and reduces the error diffusion "worming" artifact. The highlight threshold adjustment module 330 adjusts the threshold levels 700 in order to prevent the "B" pixels from firing around the "A" pixels within the highlight regions. The threshold level 700 can be only adjusted in the highlights when quantizing the "B" pixels in order to prevent the pixels from firing close to their "A" pixel counterparts. The amount of threshold adjustment is programmable and is easily incorporated within the LRED calculations utilizing the high-speed SIMD instructions.

FIGS. 9-14 illustrate bitmaps 720, 740, 760, 780, 800, and 820 processed via the LRED algorithm 325 with various highlight threshold adjustment level 700, in accordance with the disclosed embodiments. The bitmaps 720, 740, 760, 780, 800, and 820 can be processed via the LRED algorithm 325 with various highlight threshold adjustment levels 700. Note that the dot clustering effect can be reduced with higher-levels of adjustments, albeit with structural changes in dot placement (which is typically suppressed with scanner noise). The bitmap 720 represents LRED with Δ=0 highlight adjust, bitmap 740 represents LRED with Δ=8 highlight adjust, bitmap 760 represents LRED with Δ=15 highlight adjust, bitmap 780 represents LRED with Δ=20 highlight adjust, bitmap 800 represents LRED with Δ=32 highlight adjust, and bitmap 820 represents LRED with Δ=40 highlight adjust.

Figure 15:
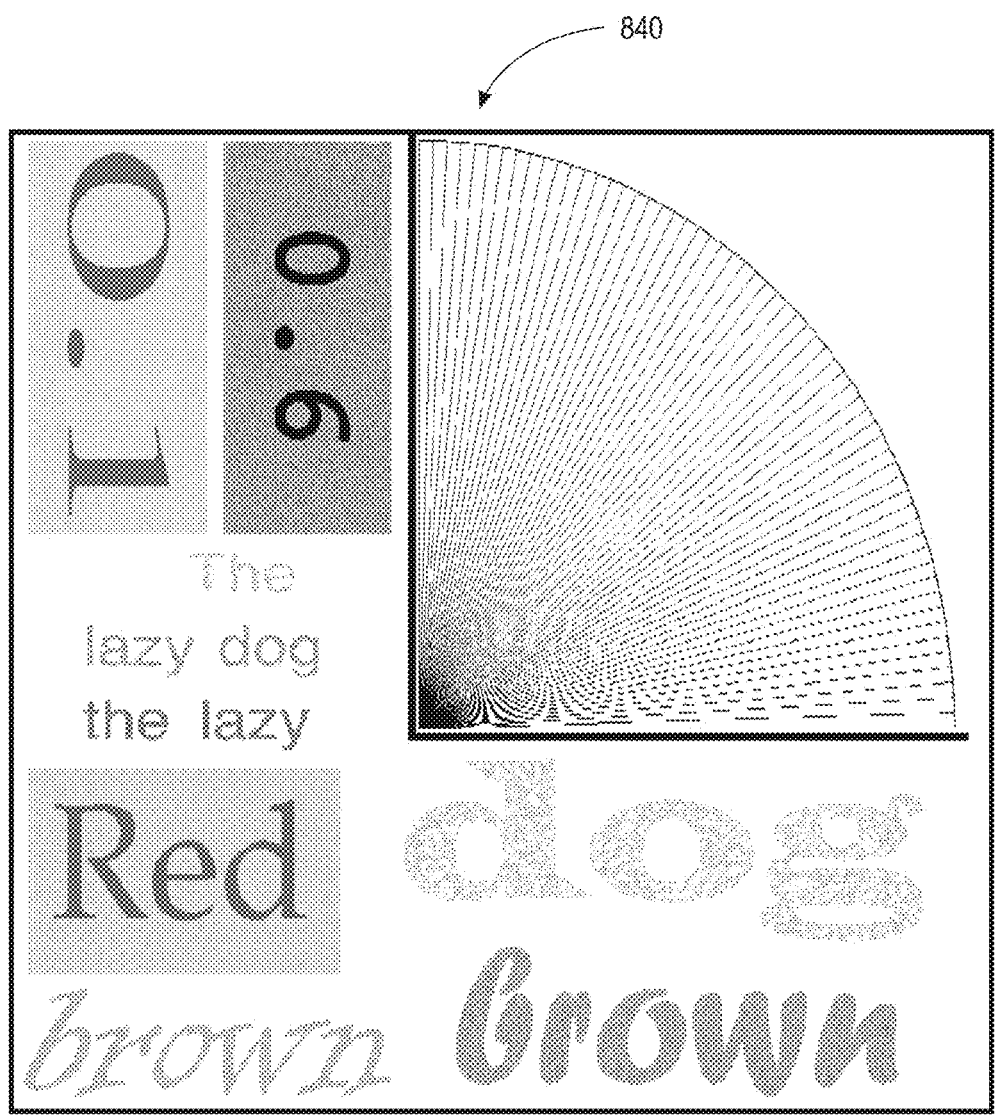
FIGS. 15-17 illustrate bitmaps generated and processed via a synthetic 600×300 spi input image in order to compare the LRED algorithm with other image-processing alternatives, in accordance with the disclosed embodiments.
Figure 16:
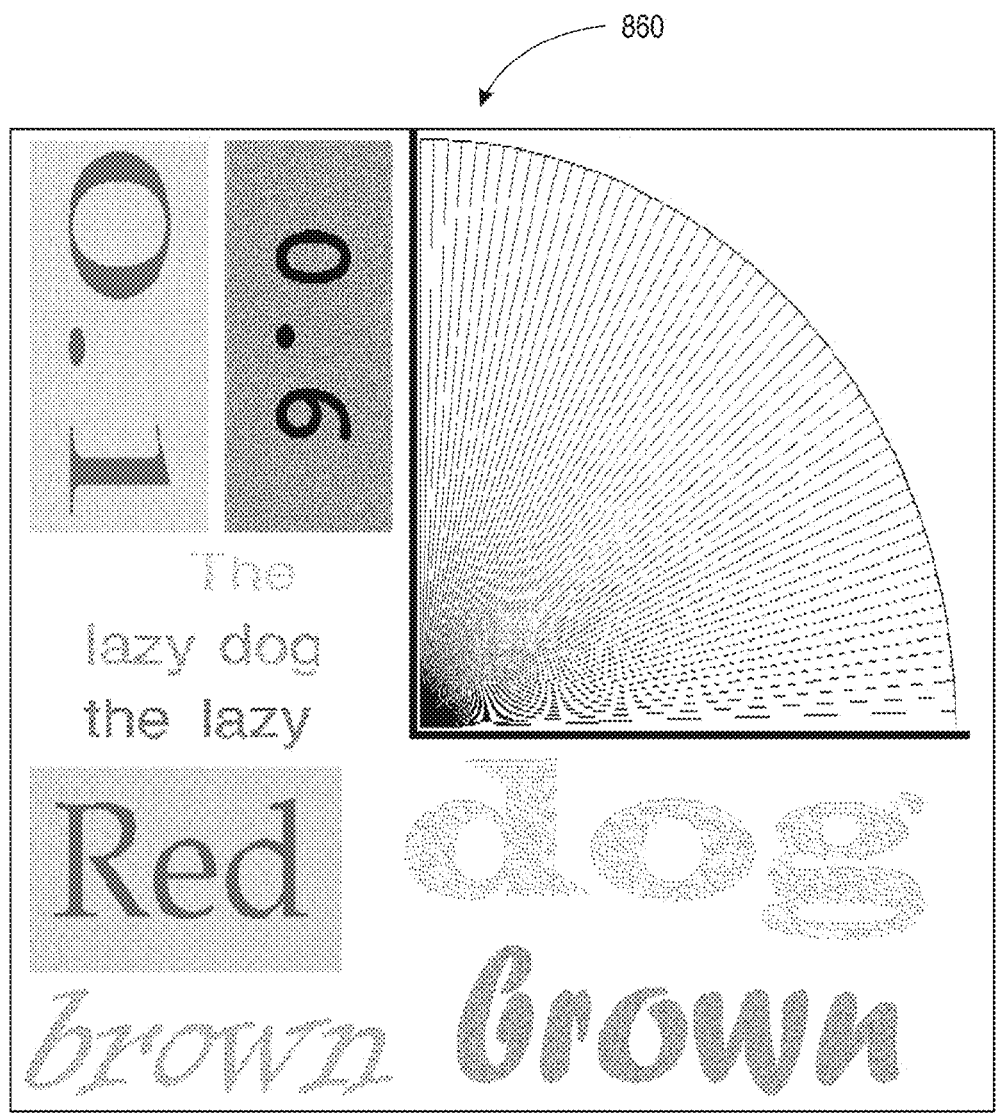
Figure 17:
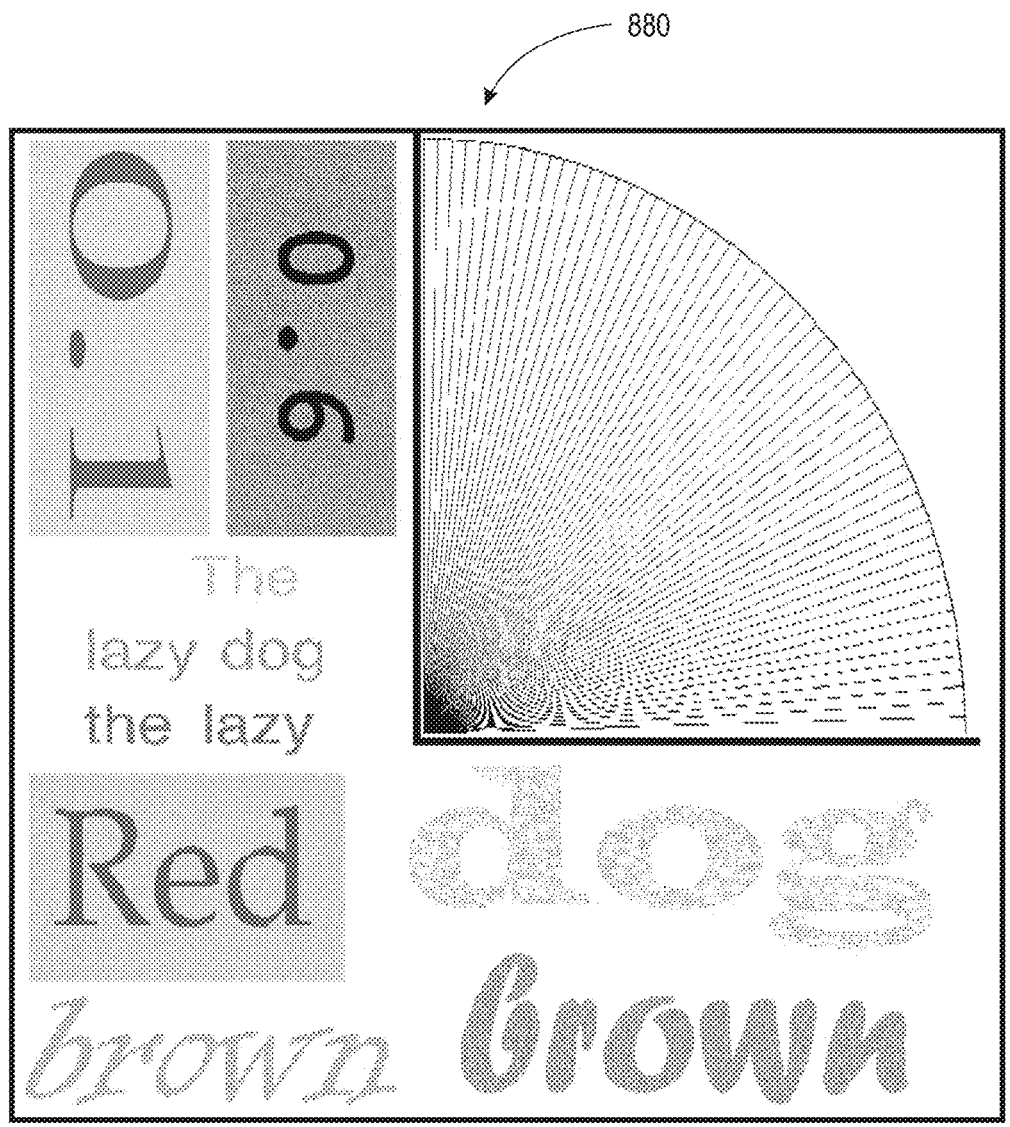

FIGS. 15-17 illustrate bitmaps 840, 860, and 880 generated and processed via a synthetic 600×300 spi input image in order to compare the LRED algorithm 325 with other image-processing alternatives, in accordance with the disclosed embodiments. The bitmap 840 can be first scaled to 600×600 spi in the 8 bpp realm and then rendered utilizing conventional error diffusion, whereas the bitmap 860 can be first processed utilizing conventional error diffusion and then scaled to the 600×600 dpi resolution within the 1 bpp realm. The bitmap 880 can be processed with the LRED algorithm 325.

The scaling in the 1 bpp domain 880 can be degraded due to the clustering of binary pixels (i.e. compare the "dog" bitmap region, whereas the comparable bitmap outputs 840 and 860 are similar and maintain the density/integrity of the input image). Although the IQ is approximately similar between bitmaps 840 and 860, processing the 600×300 spi image via the LRED algorithm 325 is approximately one-half the time relative to the conventional approach and therefore, offers an immense performance advantage.

The system 300 processes images at a lower resolution and then upscales in order to provide the necessary 2× slow-scan scaling factor at the final rendering stage in a software image path (SWIP) environment. Matching the scanner's inherent (e.g., 600×300 spi) scanner resolution to the intermediate image processing modules permits more complex algorithms to be explored, thereby providing potential IQ improvements/enhancements while at the same time meeting the overall document processing throughput requirements. In other words, by reducing the amount of data required to process an image within the upstream filter/segmentation/color-space conversion modules, more time is available to incorporate further intermediate and complex per-pixel processing features to each algorithm.

The LRED algorithm 325 can be developed and written in $C^{++}$ using SIMD instruction code in order to faithfully model the rendered output, evaluate the resulting IQ, and ultimately to demonstrate/measure the high-speed benefits that can be achieved within a software image-path environment.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for processing a low resolution image, said method comprising:
   converting a low-resolution binary output pixel to a predetermined number of interpolated sub-pixel values;
   comparing each interpolated sub-pixel value among said predetermined number of interpolated sub-pixel values with a threshold to generate a scaled slow-scan output pixel utilizing a low resolution error diffusion algorithm;
   adjusting said threshold level to produce a threshold adjustment and prevent said scaled slow-scan output pixel from firing about said low resolution binary output pixel within a highlight region; and
   distributing and storing a slow scan error with respect to said scaled slow-scan output pixel via an error diffusion filter coefficient within an error buffer without additional memory to improve image processing throughput rate.

2. The method of claim 1 further comprising generating said low resolution binary output pixel utilizing a general error diffusion algorithm.

3. The method of claim 2 further comprising up-scaling said native resolution binary output pixel without impacting either said image-processing throughput rate and degrading an output image-quality by said low resolution error diffusion algorithm.

4. The method of claim 2 further comprising:
   programming an amount of said threshold adjustment;
   incorporating said threshold adjustment within said low resolution error diffusion algorithm utilizing a high-speed SIMD instruction; and
   adjusting said threshold level in said highlight region when quantizing said scaled slow-scan output pixel in order to prevent said pixel from firing close to said low resolution binary output pixel counterparts.

5. The method of claim 4 further comprising selecting a potential error value based on a number of interpolated sub-pixel values exceeding said threshold value.

6. The method of claim 5 further comprising;
   processing said low resolution binary output pixel; and
   up-scaling said low resolution binary output pixel to provide at least a 2× slow-scan scaling factor with respect to a final rendering stage in a software image path environment.

7. The method of claim 5 further comprising:
   configuring a low resolution error diffusion module to include said general error diffusion algorithm and said low resolution error diffusion algorithm to generate at least two distinct binary output pixels; and
   reducing an amount of data required to process said low resolution binary output pixel so that more time is available to incorporate an intermediate and complex per-pixel processing feature within said low resolution error diffusion algorithm and said general error diffusion algorithm.

8. A system for processing a low resolution image, said system comprising:
   a processor;
   a data bus coupled to said processor; and a computer-usable medium embodying computer program code, said computer-usable medium being coupled to said data bus, said computer program code comprising instructions executable by said processor and configured for:
 converting a low-resolution binary output pixel to predetermined number of interpolated sub pixel values;
 comparing each interpolated sub-pixel value among said predetermined number of interpolated sub-pixel values with a threshold to generate a scaled slow-scan output pixel utilizing a low resolution error diffusion algorithm;
 adjusting said threshold level to produce a threshold adjustment and prevent said scaled slow-scan output pixel from firing about said low resolution binary output pixel within a highlight region; and
 distributing and storing a slow scan error with respect to said scaled slow-scan output pixel via an error diffusion filter coefficient within an error buffer without additional memory to improve image processing throughput rate.

9. The system of claim 8 wherein said instructions are further configured for generating said low resolution binary output pixel utilizing a general error diffusion algorithm.

10. The system of claim 9 wherein said instructions are further configured for up-scaling said native resolution binary output pixel without impacting either said image-processing throughput rate and degrading an output image-quality by said low resolution error diffusion algorithm.

11. The system of claim 9 wherein said instructions are further configured for:
 programming an amount of said threshold adjustment;
 incorporating said threshold adjustment within said low resolution error diffusion algorithm utilizing a high-speed SIMD instruction; and
 adjusting said threshold level in said highlight region when quantizing said scaled slow-scan output pixel in order to prevent said pixel from firing close to said low resolution binary output pixel counterparts.

12. The system of claim 11 wherein said instructions are further configured for selecting a potential error value based on a number of interpolated sub-pixel values exceeding said threshold value.

13. The system of claim 12 wherein said instructions are further configured for:
 processing said low resolution binary output pixel; and
 up-scaling said low resolution binary output pixel to provide at least a 2× slow-scan scaling factor with respect to a final rendering stage in a software image path environment.

14. The system of claim 12 wherein said instructions are further configured for:
 providing a low resolution error diffusion module to include said general error diffusion algorithm and said low resolution error diffusion algorithm to generate at least two distinct binary output pixels; and
 reducing an amount of data required to process said low resolution binary output pixel so that more time is available to incorporate an intermediate and complex per-pixel processing feature within said low resolution error diffusion algorithm and said general error diffusion algorithm and wherein said low resolution error diffusion algorithm includes a highlight adjustment module.

15. A non-transitory processor-readable medium storing computer code representing instructions to cause processing of a low resolution image, said computer code comprising code to;
 convert a low-resolution binary output pixel to a predetermined number of interpolated sub pixel values;
 compare each interpolated sub-pixel value among said predetermined number of interpolated sub-pixel values with a threshold to generate a scaled slow-scan output pixel utilizing a low resolution error diffusion algorithm;
 adjust said threshold level to produce a threshold adjustment and prevent said scaled slow-scan output pixel from firing about said low resolution binary output pixel within a highlight region; and
 distribute and store a slow scan error with respect to said scaled slow-scan output pixel via an error diffusion filter coefficient within an error buffer without additional memory to improve image processing throughput rate.

16. The non-transitory processor-readable medium of claim 15 wherein said code further comprises code to generate said low resolution binary output pixel utilizing a general error diffusion algorithm.

17. The non-transitory processor-readable medium of claim 16 wherein said code further comprises code to up-scale said native resolution binary output pixel without impacting either said image-processing throughput rate or degrading an output image-quality by said low resolution error diffusion algorithm.

18. The non-transitory processor-readable medium of claim 17 wherein said code further comprises code to:
 program an amount of said threshold adjustment;
 incorporate said threshold adjustment within said low resolution error diffusion algorithm utilizing a high-speed SIMD instruction; and
 adjust said threshold level in said highlight region when quantizing said scaled slow-scan output pixel in order to prevent said pixel from firing close to said low resolution binary output pixel counterparts.

19. The non-transitory processor-readable medium of claim 18 wherein said code further comprises code to select a potential error value based on a number of interpolated sub-pixel values exceeding said threshold value.

20. The non-transitory processor-readable medium of claim 18 wherein said code further comprises code to:
 process said low resolution binary output pixel;
 up-scale said low resolution binary output pixel to provide at least a 2× slow-scan scaling factor with respect to a final rendering stage in a software image path environment;
 provide a low resolution error diffusion module to include said general error diffusion algorithm and said low resolution error diffusion algorithm to generate at least two distinct binary output pixels.

* * * * *